US010777186B1

(12) United States Patent
Stefani et al.

(10) Patent No.: US 10,777,186 B1
(45) Date of Patent: Sep. 15, 2020

(54) STREAMING REAL-TIME AUTOMATIC SPEECH RECOGNITION SERVICE

(71) Applicant: Amazon Technologies, Inc., Seattle, WA (US)

(72) Inventors: Stefano Stefani, Issaquah, WA (US); Pramod Gurunath, Sammamish, WA (US); Ashish Singh, Bothell, WA (US); Katrin Kirchoff, Seattle, WA (US); Deepikaa Suresh, Seattle, WA (US); Varun Sembium Varadarajan, Bothell, WA (US); Vasanth Philomin, Seattle, WA (US); Vikram Sathyanarayana Anbazhagan, Issaquah, WA (US); Pu Paul Zhao, Seattle, WA (US); Vijit Gupta, Mercer Island, WA (US); Ruoyu Huang, Seattle, WA (US)

(73) Assignee: Amazon Technolgies, Inc., Seattle, WA (US)

( * ) Notice: Subject to any disclaimer, the term of this patent is extended or adjusted under 35 U.S.C. 154(b) by 122 days.

(21) Appl. No.: 16/190,047

(22) Filed: Nov. 13, 2018

(51) Int. Cl.
*G10L 15/00* (2013.01)
*G10L 15/06* (2013.01)
*G10L 25/78* (2013.01)
*G10L 15/30* (2013.01)
*G10L 15/04* (2013.01)
(Continued)

(52) U.S. Cl.
CPC ............ *G10L 15/063* (2013.01); *G10L 15/04* (2013.01); *G10L 15/183* (2013.01); *G10L 15/26* (2013.01); *G10L 15/30* (2013.01); *G10L 25/78* (2013.01); *G10L 2015/0631* (2013.01)

(58) Field of Classification Search
CPC ... G10L 15/22; G10L 2015/223; G10L 15/30; G10L 15/265; G10L 15/02; G10L 17/22; G10L 15/32; G10L 15/00; G10L 25/51; G10L 25/54; G10L 15/222
See application file for complete search history.

(56) References Cited

U.S. PATENT DOCUMENTS

| 8,453,058 B1 * | 5/2013 | Coccaro | ............... G06Q 10/103 |
| | | | 705/319 |
| 8,762,156 B2 * | 6/2014 | Chen | ....................... G10L 15/26 |
| | | | 704/10 |
| 9,275,637 B1 * | 3/2016 | Salvador | ................. G10L 15/01 |

(Continued)

*Primary Examiner* — Edgar X Guerra-Erazo
(74) *Attorney, Agent, or Firm* — Nicholson De Vos Webster & Elliott LLP

(57) ABSTRACT

Techniques for streaming real-time automated speech recognition (ASR) are described. A user can stream audio data to a frontend service of the ASR service. The frontend service can establish a bi-directional connection to an audio decoder host to perform ASR on the data stream. The audio decoder host may include a streaming ASR engine which can analyze chunks of the audio data stream using an acoustic model to divide the audio data into words, and a language model to identify sentences made of the words spoken in the audio file. The acoustic model can be trained using short audio sentence data (e.g., on the order of 30 seconds to a few minutes), enabling the transcription service to accurately transcribe short chunks of audio data. The results are then punctuated and normalized. The resulting transcript is then streamed back to the user over the bi-directional connection.

20 Claims, 9 Drawing Sheets

(51) Int. Cl.
*G10L 15/26* (2006.01)
*G10L 15/183* (2013.01)

(56) References Cited

U.S. PATENT DOCUMENTS

| | | | | |
|---|---|---|---|---|
| 9,318,107 | B1* | 4/2016 | Sharifi | G10L 17/22 |
| 9,542,941 | B1* | 1/2017 | Weksler | G10L 15/22 |
| 9,653,075 | B1* | 5/2017 | Chen | G10L 25/78 |
| 10,032,452 | B1* | 7/2018 | Bhaya | G06F 3/165 |
| 10,152,723 | B2* | 12/2018 | Warner | G06Q 30/02 |
| 10,535,348 | B2* | 1/2020 | Bhaya | G06F 3/165 |
| 10,593,329 | B2* | 3/2020 | Bhaya | G06F 3/167 |
| 2003/0154072 | A1* | 8/2003 | Young | G06F 16/40 |
| | | | | 704/9 |
| 2005/0086059 | A1* | 4/2005 | Bennett | G06F 40/216 |
| | | | | 704/270 |
| 2007/0276651 | A1* | 11/2007 | Bliss | G10L 15/30 |
| | | | | 704/9 |
| 2009/0210491 | A1* | 8/2009 | Thakkar | H04N 7/147 |
| | | | | 709/204 |
| 2013/0325449 | A1* | 12/2013 | Levien | G10L 15/06 |
| | | | | 704/201 |
| 2014/0229184 | A1* | 8/2014 | Shires | G10L 15/32 |
| | | | | 704/275 |
| 2017/0237801 | A1* | 8/2017 | Baluja | H04L 67/325 |
| | | | | 709/217 |
| 2017/0257456 | A1* | 9/2017 | Vaish | H04L 67/42 |
| 2017/0300977 | A1* | 10/2017 | Warner | G06F 16/489 |
| 2018/0190277 | A1* | 7/2018 | Bhaya | G10L 15/22 |
| 2018/0191788 | A1* | 7/2018 | Lewis | G06F 9/505 |
| 2018/0322536 | A1* | 11/2018 | Zhang | G06Q 30/0277 |
| 2018/0322878 | A1* | 11/2018 | Bhaya | G06F 3/165 |
| 2018/0322879 | A1* | 11/2018 | Bhaya | G06F 3/167 |
| 2019/0104199 | A1* | 4/2019 | Rothman | H04L 43/0805 |
| 2020/0066274 | A1* | 2/2020 | Bhaya | G06F 3/167 |
| 2020/0098369 | A1* | 3/2020 | Bhaya | G10L 15/14 |

* cited by examiner

500

```
{
   "LanguageCode" : "enum",
   "MediaSampleRateHertz" : "integer",
   "MediaEncoding" : "enum",
   "AudioStream" : "eventstream" //stream of audio
   "AudioTimeOffset" : "integer"
   "CustomDictionaryID" : "string"
}
```

502

504

```
{
  "RequestID" : "string",
  "LanguageCode" : "enum",
  "MediaSampleRateHertz" : "integer",
  "MediaEncoding" : "enum",
  "TranscriptionResultStream" : "eventstream" //stream of transcript
}
```

STREAMING REAL-TIME AUTOMATIC SPEECH RECOGNITION SERVICE

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be time and resource consumptive and filled with complexities. Moreover, machine learning models tend to be focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which:

FIG. 5 illustrates an example application programming interface (API), according to some embodiments.

DETAILED DESCRIPTION

Various embodiments of methods, apparatus, systems, and non-transitory computer-readable storage media for streaming real-time automatic speech recognition (ASR) are described. Embodiments provide a streaming ASR service that receives an audio data stream from a customer automatically generates transcripts of the speech the audio data stream includes. According to some embodiments, a user can stream audio data (e.g., telephonic quality or higher) to a frontend service of the ASR. The frontend service can then establish a connection to an audio decoder host to perform ASR on the data stream. A bi-directional connection is established with the audio decoder host which includes a streaming ASR engine. The streaming ASR engine can analyze chunks of the audio data stream using an acoustic model to divide the audio data into words, and a language model to identify sentences made of the words spoken in the audio file. The acoustic model can be trained using short audio sentence data (e.g., on the order of 30 seconds to a few minutes), enabling the transcription service to accurately transcribe short chunks of audio data. The results are then punctuated and normalized. The resulting transcript is then streamed back to the user over the bi-directional connection.

Figure 1:
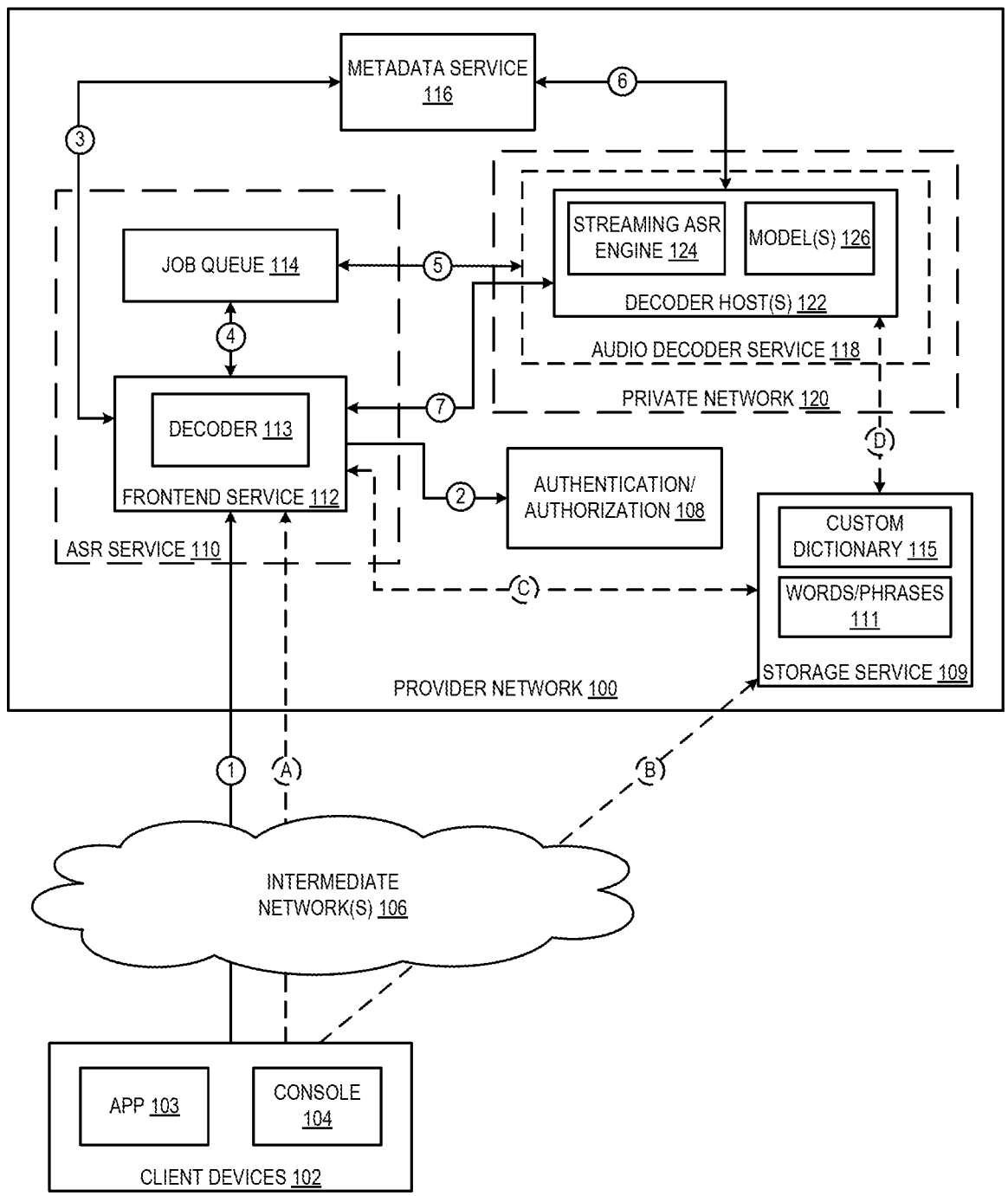
FIG. 1 is a block diagram illustrating an architecture of a streaming real-time automatic speech recognition (ASR) service, according to some embodiments.

FIG. 1 is a block diagram illustrating an architecture of a streaming real-time automatic speech recognition (ASR) service 110, according to some embodiments. Such an ASR service can be implemented in and/or provided by a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via an application 103 implementing a software development kit (SDK), a console 104 implemented as a website or application, etc. The interface(s) may be part of, or serve as a frontend to, a control plane 118 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a frontend service 112 can receive audio recognition and customized model building requests. As shown at numeral 1, a request from a client device can be sent to frontend service 112 via one or more intermediate networks 106. In some embodiments, the frontend service 112 is responsible for at least one of: authentication and authorization of requests with an authentication and/or authorization service 108; communicating with a metadata service 116 to submit user requests to audio decoder service 118; and returning transcripts to the users in real-time as results are available for each portion of an audio data stream. In some embodiments, user requests may be throttled by the frontend service 112 depending on available resources. For example, at numeral 2, frontend service 112 can authorize and/or authenticate the request received from client device 102.

In some embodiments, the request can include a reference to an audio data stream, such as a URI, URL, or other link to the audio data stream. Various languages may be supported, including English and Spanish speech-to-text conversion. A streaming ASR engine 124 provides accurate transcription for 9 Khz (telephony quality) audio, 16 Khz (HD voice) audio, or better. This allows both high fidelity recordings, as well as lower quality telephony recordings common in call center systems, to be transcribed. In some embodiments, the reference to the audio data stream may be provided through an API.

After frontend service 112 has authenticated/authorized the transcription request, at numeral 3, the frontend service 112 can store request metadata in metadata service 116. Metadata service 116 can encapsulate interactions with a storage layer, e.g., a database service or other storage service. The metadata service 116 may store an entry for each request which includes a host ID and/or IP address as an attribute and a request ID as a key. At numeral 4, the frontend service 112 can enqueue the transcription request in job queue 114. The job queue may include a plurality of messages each including a request ID associated with the incoming request. In some embodiments, the frontend service 112 may begin buffering audio from the associated audio stream when the request is received and prior to a connection being made with audio decoder service 118.

At numeral 5, a decoder host from a decoder host fleet 122 can poll the job queue 114 to obtain a next request to be processed. The decoder host can obtain a request ID from the message obtained from the job queue and update the corresponding entry in metadata service 116 to include a reference to the decoder host, at numeral 6. The reference to the decoder host may include a host ID or IP address associated with the decoder host. Once the metadata service has been updated with the reference to the decoder host, the request can be deleted from the job queue 114. The frontend service can check metadata service 116 to obtain the reference to the decoder host and can use the reference to connect to the decoder host 122 and begin streaming audio data, at numeral 7. In some embodiments, the frontend service 112 can first stream the audio data that has been buffered to the decoder host and then the remainder of the audio data stream.

In some embodiments, the decoder host 122 can accept the audio stream from frontend service 112 and convert the audio stream into a transcription stream and return the transcription stream to the frontend service 112 over the same connection. As shown in FIG. 1, each decoder host can include a streaming ASR engine 124 and one or more models 126. In some embodiments, the streaming engine instance 124 can service one streaming session at any given time. On each streaming request, the streaming engine can reset the processing chain, including all buffers in between, ensuring that any data that was stored from a previous session has been purged and is not mixed with data from a new streaming session. Data received from the audio stream is treated as audio samples (e.g., interpreted as a vector of 2-byte signed integers). If the data is not audio data, then it is processed like random noise. This way, if a malicious user were to submit non-audio data, they would receive a nonsensical transcription in response, without compromising the system.

In some embodiments, the frontend service 112 can include a decoder 113. The decoder 113 can decode a portion of the audio stream to determine an audio stream type. The audio stream type may correspond to the audio codec used to encode the audio stream or other audio stream properties. The frontend service can include an identifier associated with the audio stream type with the entry corresponding to the request in metadata service 116. Additionally, or alternatively, the frontend service can add an identifier associated with audio stream type to the job queue with the request. In some embodiments, different decoder hosts may be configured to support a particular audio stream type or a number of audio stream types. When a decoder polls job queue 114 to identify a next job to be performed, the decoder host can poll for a next request associated with an audio stream type that is supported by the decoder host. Additionally, or alternatively, when a decoder host polls a next job from the job queue, the decoder host can pull job details from the metadata service 116 to determine whether the audio stream type associated with that job is supported by the decoder host before the decoder host accepts the job.

In some embodiments, models 126 can include an acoustic model and a language model. The streaming ASR engine 124 break the audio stream into portions of audio data (also referred to herein as "chunks"). In some embodiments, the streaming ASR engine 124 can identify silence within the audio data stream and use the silence as a boundary between chunks. The streaming ASR engine may be configured with a limit as to the length of a given chunk (e.g., 30 seconds). For each chunk of audio data, the streaming ASR engine can use the acoustic model to break the audio data into a series of words. The output of the acoustic model can be passed through the language model to identify phrases and/or sentences corresponding to the series of words identified by the acoustic model. The language model includes grammar rules, language constructs, and other language-specific nuances. In some embodiments, the language model can include a custom dictionary that includes jargon or other domain specific words or phrases. The language model analyzes the input and determines whether the series of words makes sense in the language of the language model. For example, the output includes a plurality of hypotheses associated with each resulting sentence (or series of words). The hypotheses include a confidence value indicating how likely the streaming ASR engine 124 believes the sentence to be correctly transcribed. In some embodiments, when the audio file includes multiple speakers, each speaker's portion can be tagged with the speaker. Each speaker's tagged audio can then be processed by speech-to-text engine, and then the result is punctuated and normalized. Normalization may include determine the formatting of language (e.g., determine whether "eleven fifteen" should be represented as 11:15, 11/15, eleven fifteen, etc. depending on context). The output of the language model can be passed through a search algorithm to identify a highest confidence transcription. The search algorithm can be tuned to identify a "best" match or to identify a match more quickly.

As discussed, the decoder host constructs a search space for word hypotheses based on language model predictions. The search space can be traversed using a tree-based decoder. Paths in the search space can be evaluated based on a weighted combination of language model and acoustic model scores associated with each word or series of words. When streaming, the scores from the acoustic model can be generated by averaging acoustic model scores for each input window over time. The best search path (corresponding to a sequence of words) can be identified by a partial traceback at the end of each input chunk. The accuracy of the transcription can be improved by increasing the input window (e.g., enabling the model to analyze the transcription in view of later words in the audio). However, increasing this window can also increase the latency of the resulting transcription. Accordingly, in some embodiments, the user can select between increased accuracy or increased latency of the transcription. For example, the user can indicate an acceptable latency time which the decoder host can convert to an input window length, or the user may select between one or more accuracy values (e.g., high, medium, low) which the decoder host can use to select corresponding input window lengths. In some embodiments, the user may be provided an initial transcription with low latency and be provided with a second, more accurate transcription at a later time.

In some embodiments, the user can provide a custom dictionary to be used to transcribe audio that include jargon or other domain specific words or phrases. As shown at A, a user can send a request to frontend service 112 to add a custom dictionary. In some embodiments, the request may include a name or identifier for the custom dictionary and a list of words of phrases to be included in the custom dictionary. In some embodiments, the user can upload a file including the words or phrases to be included in the custom dictionary to storage service 109, as shown at B. In such instances, the request to create a custom dictionary may include a reference to the file 111. At C, the frontend service can retrieve the dictionary file 111 and generate the custom dictionary 115 using the file. In some embodiments, the frontend service can create the custom dictionary 115 using the words or phrases included in the initial request at A. Once the custom dictionary 115 has been created, requests sent to the frontend service to perform ASR using the custom dictionary can include the name or identifier assigned to the custom dictionary. At D, the decoder host can use the name or identifier assigned to the custom dictionary to retrieve the custom dictionary 115 from the storage service 109 and use the custom dictionary in the transcription of the audio stream.

In some embodiments, the acoustic model can be trained using longer sentences (e.g., two minutes or longer sentences). In some embodiments, the acoustic model may be a long-short term memory (LSTM) neural network, though in other embodiments other machine learning models (e.g., neural networks such as recurrent neural networks (RNNs)) may be used. Audio input can be segmented into two-minute chunks which may extend past two minutes until a first silence is detected. In some embodiments, training may be performed continuously. In such embodiments, transcription performance can be compared against the audio processed previously (e.g., in a past day or other prior time period) to identify any gaps in accuracy as a function of genres, acoustic properties, customer etc. Data may then be selected from a corpus of audio data (e.g., existing data sets and data captured from customers), and used to train the acoustic model to improve accuracy. The training loop may be performed continuously, daily, weekly, or according to another schedule to maintain accuracy of the acoustic model.

As described herein, neural networks may be utilized in some embodiments. A neural network may include multiple of layers of nodes, including hidden layers. A hidden layer may include nodes that are linked with incoming and outgoing connections. These connections may be weighted. Data can be passed through these layers to generate an output of the neural network. Neural networks can learn as data is provided to them, adjusting the weights associated with the various connections each time new data is presented. Training the acoustic model based on a training dataset may be performed iteratively. The neural network adjusts the weights to identify the correct words spoken in input audio samples. In some embodiments, training may include supervised and/or unsupervised training phases. As training data is passed through the base model, words spoken in the training data are classified. During supervised training, feedback on whether the words have been correctly identified can be received from one or more computing devices or services.

In some embodiments, the correct classifications can be compared to the output of the neural network's final layer. Based on this comparison, differences between the output and the correct classifications can be back-propagated to previous layers of the neural network. This feedback can be modified based on a transfer function associated with the neural network and/or between these layers (e.g., using the derivative of the transfer function) and used to modify the weights associated with the connections. In some embodiments, a delta rule, such as a gradient descent learning rule, can be used to for updating the weights of the inputs to artificial neurons in a neural network. In some embodiments, training may use one or more machine learning libraries.

During training of a neural network, one or more parameters (sometimes referred to as "hyperparameters") may be set, such as by a user or machine learning process. These hyperparameters may include hidden units, learning rate, momentum, weight, maximum norm, batch size, maximum tries, maximum iterations, etc. By adjusting these parameters, the amount of change to the neural network from feedback (e.g., changes to weights for the connections) can be increased or decreased. This may affect both how quickly the neural network learns the training material and how accurately the neural network performs. For example, momentum adds part of the previous weight to the current weight of a given connection. By adjusting the momentum, the neural network can avoid settling in a local minimum during training or missing the minimum during training.

In some embodiments, the connection formed between the frontend service 112 and the decoder host 122 can be a bi-directional connection, such as an HTTP2 connection. Once the connection has been made, the audio data stream is forwarded by the frontend service to the decoder host, allowing the user's audio stream to be sent directly to the decoder host performing the transcription. Because the connection is bi-directional, the transcription can be streamed back to the user in real-time as the text is generated by the decoder host. In some embodiments, each chunk of the audio data stream may be signed. In some embodiments, the audio data stream may be signed using chunked content encoding, in which a trailing signature is added to the body of each HTTP payload. In addition, in some embodiments, a signature protocol can be added to sign the HTTP headers. The audio data chunks can only be processed if a correctly signed body is received and the signed body references the signed headers. In some embodiments, each chunk can include its own signature. The resulting signatures can chain together, such that each chunk signature includes the signature of the previous part, e.g., signature of chunk N can be f (chunk N, signature (chunk N-1)).

In some embodiments, the audio data stream may be open for several hours but is being transcribed in small (e.g., approximately 30 second long) chunks. As audio is streamed in, the ASR service processes the audio and streams back text. Because the transcription is provided in real time, the transcript may be improved later as more audio is received (e.g., once additional audio has been analyzed the context in which a given phrase is used may change, changing the confidence of various transcription hypotheses). As a result, an improved transcript can be provided out-of-band to be used with non-real-time performances of the audio data stream. For example, the real-time transcription may be used to provide closed captions of a live event, while the improved non-real-time transcription may be used to provide closed captions for a replay of the live event.

In some embodiments, audio data may be provided to the ASR service at a faster than real-time speed. For example, prerecorded audio data or buffered audio data may be provided at higher than real-time speed. If audio is received too fast, then the ASR service may drop portions of the audio in order to catch up to real-time. In some embodiments, the HTTP2 connection can allow for slow clients and fast clients, depending on how fast a client is producing audio. If a customer is sending more audio than real-time, the ASR service can determine an audio velocity. If the velocity is too high, the customer can be alerted to slow down their audio velocity. If the audio velocity remains too fast, audio may be buffered or dropped. If the audio exceeds the buffer size, then audio may also be dropped.

In some embodiments, retry logic may be used in case of interruptions of long audio data streams. For example, if an audio data stream is interrupted and restored within a configurable amount of time, the session may be resumed with the same decoder host. This maintains a consistent context for the audio transcription. In some embodiments, the customer may be provided with a session token for use in the audio transcription. If the customer retries the transcription with the original session token, the details of the interrupted session can be determined, and the original decoder host can be identified. The stream can then be routed to the original decoder host, enabling the transcription to be consistently timestamped, and speakers can be consistently labeled.

In some embodiments, the decoder host can automatically identify endpoints in the audio stream. The endpoints may correspond to pauses of speech in the audio stream. When an endpoint is identified, the connection to the decoder host can be closed. This saves resources that are required to maintain the connection and stops the decoder host from attempting to transcribe a portion of the audio stream that does not include speech. When speech resumes in the audio stream, a new connection can be opened. If the pause is less than a configurable amount of time, a new connection can be made to the same decoder host.

Figure 2:
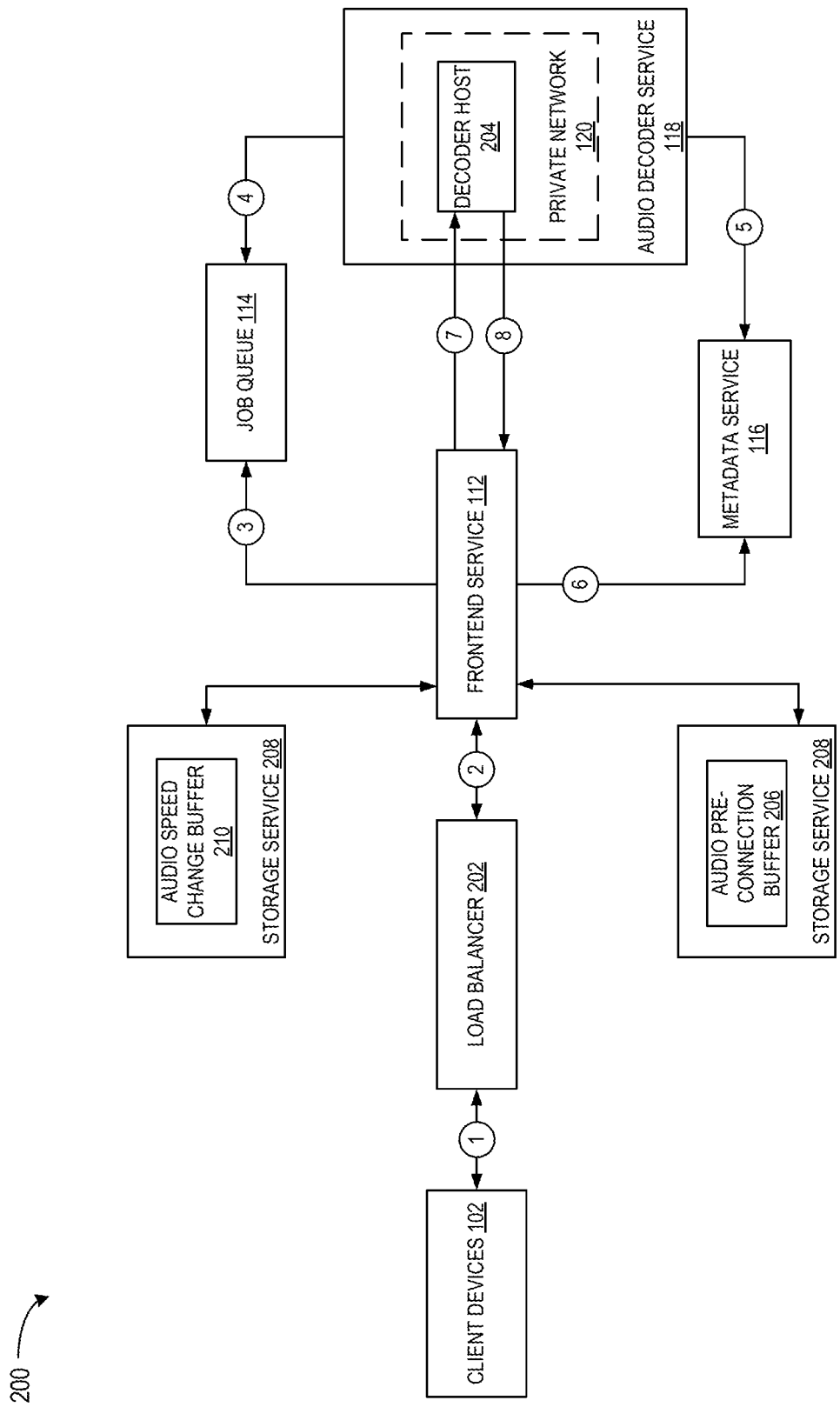
FIG. 2 is a block diagram illustrating a data flow of a streaming real-time ASR service, according to some embodiments.

FIG. 2 is a block diagram 200 illustrating a data flow of a streaming real-time ASR service, according to some embodiments. As shown in FIG. 2, a client device 102 can send a request to perform streaming real-time speech recognition at numeral 1. In some embodiments, the request may be received by load balancer 202. The load balancer can distribute the request to a frontend service 112 at numeral 2. In some embodiments, the load balancer can select a frontend service from a fleet of frontend services based on the current utilization of each frontend service (e.g., the number of requests currently being managed by each frontend service and/or the available resources of each frontend service).

At numeral 3, the frontend 112 then enqueues the request to a job queue 114. Although a job queue is shown, any of a variety of data structures that are accessible to both the frontend service 112 and the audio decoder service 118 may be used. At numeral 4, an audio decoder service host 204 which has bandwidth to process an audio transcription request can receive the enqueued message from the queue. As discussed above, the audio decoder service host 204 may be one of a plurality of decoder hosts 122 in audio decoder service 118. The audio decoder host 204 can update an entry in metadata service 116 to include a reference to the audio decoder host (e.g., a host ID and/or IP address). As discussed, in some embodiments, the metadata service 116 may include a database or other data structure which includes host ID and/or IP address as an attribute and a request ID as a key. Once the metadata service has been updated with the reference to the decoder host 204, the request can be deleted from the job queue 114. At numeral 7, the frontend service can check metadata service 116 to obtain the reference to the decoder host 204. Using the reference, the frontend service 112 can connect to the decoder host 204 and begin streaming audio data, at numeral 8.

Alternatively, in some embodiments, the frontend service can include a reference to itself (e.g., an IP address) in the request that is enqueued in job queue 114. After receiving the request from the job queue, the decoder host can send a message to the frontend service using the reference. The frontend service can then establish the connection with the decoder host. In some embodiments, the connection may be a bi-directional connection, such as an HTTP2 connection. The decoder host 204 can begin transcribing the audio data stream, as discussed above. At numeral 9, the decoder host 204 can return the transcription over the same bi-directional connection to the frontend service, which may return the transcription to the client device 102 via load balancer 202.

In some embodiments, the frontend service 112 can buffer audio data being streamed in audio buffer 206. Audio buffer 206 may be implemented in a storage service 208 that provides data storage to frontend service 112 and/or using local disk storage space and/or memory available to frontend service 112. The audio buffer 206 a pre-connection audio buffer which may be used to buffer audio data from the data stream while a connection to decoder host 204 is being established. Audio buffer 206 may additionally, or alternatively, be used to backup audio data from the audio data stream in the event of decoder host failure after a connection to the decoder host has been made. In some embodiments, the frontend service may buffer a fixed amount of audio data from the audio stream or may increase and/or decrease the amount of data buffered depending on current demand or utilization. In some embodiments, a customer may choose a buffer size, or range of sizes, to be used for their audio data. In some embodiments, a customer may choose not to buffer any data.

As discussed, audio can be streamed in at a faster-than-real-time rate. For example, audio from a prerecorded source may be streamed in faster than real-time. In some embodiments, the decoder hosts may be configured to transcribe real-time audio. As such, an audio speed change buffer 210 can be used to buffer faster than real-time audio. The frontend service can then reduce the speed of the buffered audio to real-time and stream it to the decoder hose 204 over the bi-directional connection. If the audio stream is too fast to be completely buffered in audio speed change buffer 210, some audio may be dropped. In some embodiments, if the audio stream is too fast a message can be sent to the client device 102 to slow the audio stream. In various embodiments, the audio speed change buffer can be implemented in storage service 208, as shown, or may be implemented in frontend service 112, or other storage available to frontend service 112.

In some embodiments, if the decoder host 204 fails or otherwise has issues when it is handling an audio stream, the frontend host may retry on a new audio decoder host in the audio decoder host fleet 122. If the audio stream fails, the frontend service may keep the bi-directional connection with decoder host 204 open and attempt to reconnect to the audio stream. If the frontend service successfully reconnects to the audio stream, the same decoder host 204 may continue transcribing the audio data stream. This maintains continuity in the transcription (e.g., different speakers may continue to be labeled consistently in the transcription).

Figure 3:
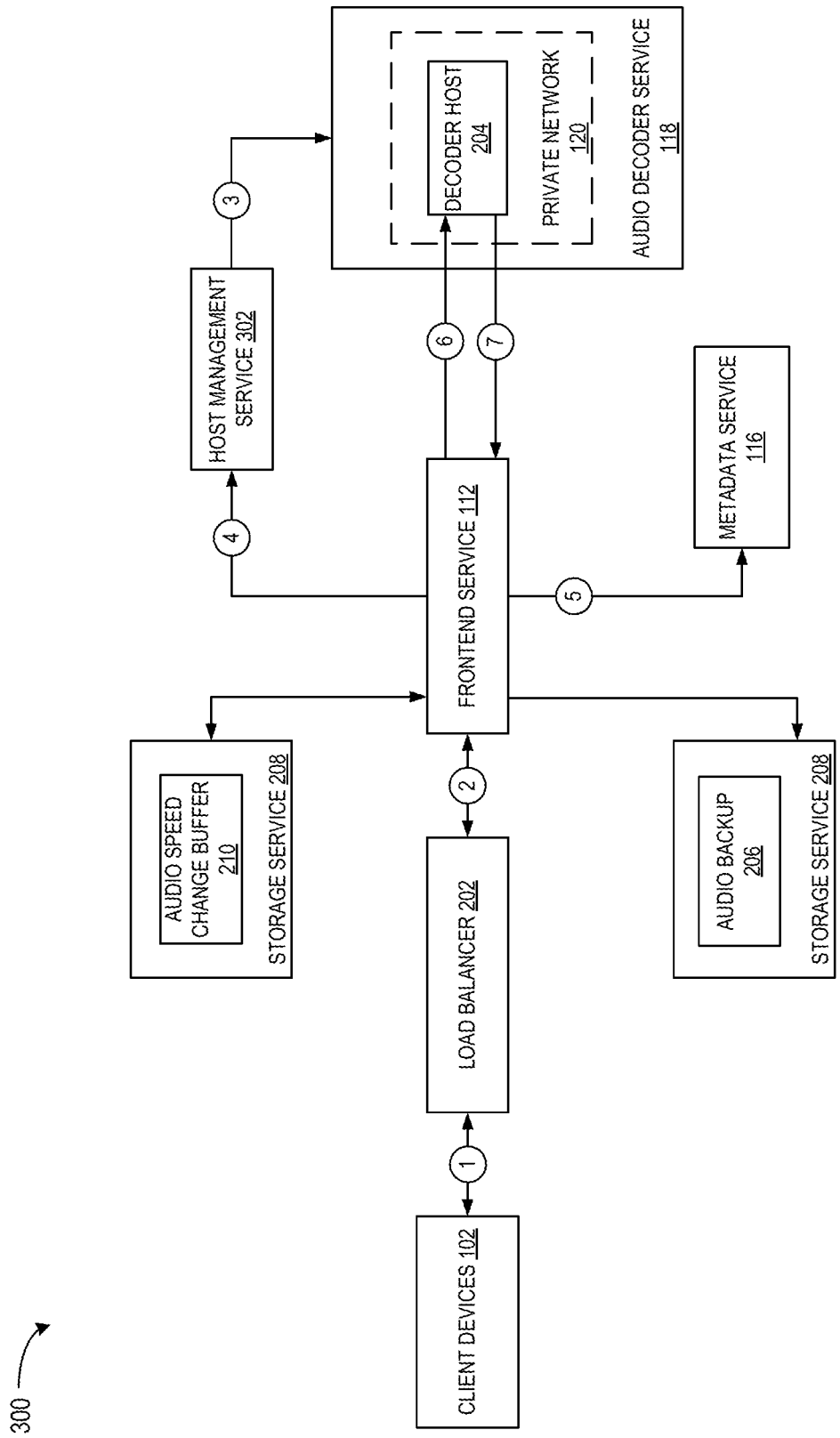
FIG. 3 is a block diagram illustrating an alternative data flow of a streaming real-time ASR service, according to some embodiments.

FIG. 3 is a block diagram 300 illustrating an alternative data flow of a streaming real-time ASR service, according to some embodiments. As shown in FIG. 3, a client device 102 can send a request to perform streaming real-time speech recognition at numeral 1. In some embodiments, the request may be received by load balancer 202. The load balancer can distribute the request to a frontend service 112 at numeral 2. In some embodiments, the load balancer can select a frontend service from a fleet of frontend services based on the current utilization of each frontend service (e.g., the number of requests currently being managed by each frontend service and/or the available resources of each frontend service).

Instead of using a job queue, as described above with respect to FIG. 2, in the embodiment of FIG. 3, a host management service 302 can manage decoder host discovery, leasing and health management. At numeral 3, the host management service 302 can cache a list of available hosts in the Audio Decoder Service 118. In some embodiments, every decoder host registers itself with the host management service and pushes its availability and/or health metrics. Alternatively, in some embodiments, the host management service periodically pulls information on the list of hosts.

At numeral 4, the frontend service can fetch an available host from host management service. The host management service may identify a host to handle the transcription request based on the availability and/or health metrics received from the fleet of decoder hosts and provide a reference to a decoder host 204 to the frontend service 112, such as a host ID or IP address. For example, the host management service may select two decoder hosts from the decoder host fleet at random and allocate the data stream to the host with a lower utilization. Alternatively, the host management service can cache a list of decoder hosts along with each host's availability. The frontend service can request a decoder host from the host management service, which can provide a reference to a decoder host and mark the decoder host as in use in the cached list.

At numeral 5, the frontend service can store request metadata in metadata service 116. For example, the frontend service can store a request ID and the reference to the decoder host 204 that was received from host management service 302. At numeral 7, the frontend service 112 can connect to the decoder host 204 using the reference provided by the host management service and begin streaming audio data. In some embodiments, the connection may be a bi-directional connection, such as an HTTP2 connection. The decoder host 204 can begin transcribing the audio data stream, as discussed above. At numeral 8, the decoder host 204 can return the transcription over the same bi-directional connection to the frontend service, which may return the transcription to the client device 102 via load balancer 202.

Similar to the embodiment shown in FIG. 2, the frontend service 112 can buffer audio data being streamed in audio backup 206. Audio backup 206 may be implemented in a storage service that provides data storage to frontend service 112 and/or using local disk storage space and/or memory available to frontend service 112. The audio backup 206 may be used to buffer audio data from the data stream while a connection to decoder host 204 is being established. Audio backup 206 may additionally, or alternatively, be used to backup audio data from the audio data stream in the event of decoder host failure.

Figure 4:
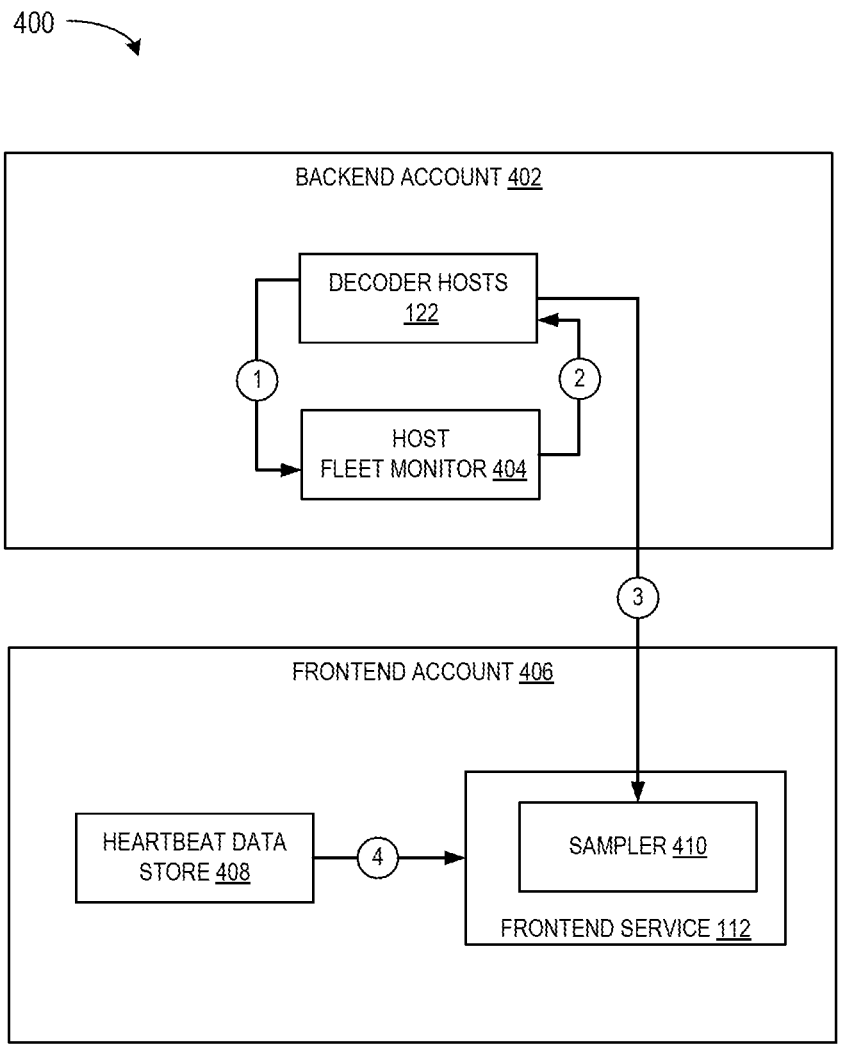
FIG. 4 is a block diagram illustrating scaling the ASR service based on utilization, according to some embodiments.

FIG. 4 is a block diagram illustrating a control plane and decoder of a managed and continuously trained ASR service, according to some embodiments. As discussed, embodiments provide streaming real-time automatic speech recognition. Each request may correspond to a long-running connection. At the beginning of serving a request, the frontend service can route the connection to a decoder host. As discussed, this can be performed by the frontend service sending a request to a job queue which is polled by available decoder hosts. Once a connection is successfully established, the decoder host is leased exclusively to the connection, and may not serve other requests until the stream is closed. Under a large load, such a system may experience delays that cause pending requests to timeout before a decoder host can poll the queue.

Embodiments may enable the decoder hosts 122 to gracefully fail requests when backend system is overloaded. As shown in FIG. 4, each decoder host from decoder hosts 122 can publish utilization metrics to a host fleet monitor 404. The decoder hosts and the host fleet monitor may be maintained in a backend account, separate from the frontend account which includes the frontend service 112. In some embodiments, because each decoder host can process a single transcription request at a time, each host may publish a metric having a binary value indicating whether that decoder host is utilized or not utilized. Each decoder host may regularly publish this metric (e.g., every second, every minute, etc.). This metric may be aggregated across the decoder host fleet to determine an aggregate utilization. The metric may be aggregated over various time periods, such as over a minute, hour, etc.

Based on the aggregate utilization metric, the host fleet monitor 404 can configure an autoscaling policy for the decoder hosts 122 at numeral 2. The autoscaling policy may increase the number of decoder hosts in the decoder host fleet or decrease the number of decoder hosts, based on utilization. In some embodiments, the autoscaling policy may define that the decoder fleet is to scale up when utilization is greater than 85%, and to scale down when utilization is less than 55%. The autoscaling policies may define the number of hosts to add or remove, which may be the same number or different numbers of hosts, and how long to wait between scaling up or scaling down before checking utilization and scaling again. In some embodiments, the autoscaling policy may cause the decoder fleet to be scaled based on predicted future demand. Future demand may be predicted using a machine learning model trained on past demand data or using other demand prediction techniques.

At numeral 3, a sampler 410 in the frontend service 112 can periodically sample the size of the decoder host fleet 122. This sampling may be performed every minute, hour, or other time period. At numeral 4, frontend service 112 can scan a heartbeat table to determine the number of live streams being processed by the decoder host fleet. In some embodiments, each frontend host can add a heartbeat to heartbeat data store 408 for each active stream and/or account every second (or other time period). The frontend service can determine overall system utilization by taking the number of live streams from heartbeat data store 408 and dividing by number of decoder hosts. If the overall system utilization is above a threshold value (e.g., 90% or other value), then new incoming transcription requests may be rejected. This allows for a buffer (e.g., available utilization above the threshold value) to account for any spikes in traffic associated with the current transcription jobs.

FIG. 5 illustrates an example application programming interface (API), according to some embodiments. As shown in FIG. 5, a request API 500 can include information about the audio data to be transcribed, such as a language code, sampling rate, encoding type, etc. The request may also include an audio stream 502 as an event stream, which provides structured data that can be consumed over the HTTP connection. In some embodiments, if the transcription job is to use a custom dictionary, the request may also include a custom dictionary identifier. Similarly, response API 504 can include a request ID associated with the request to which it is responded, as well as a transcription result stream 506, which may also be returned as an event stream.

Figure 6:
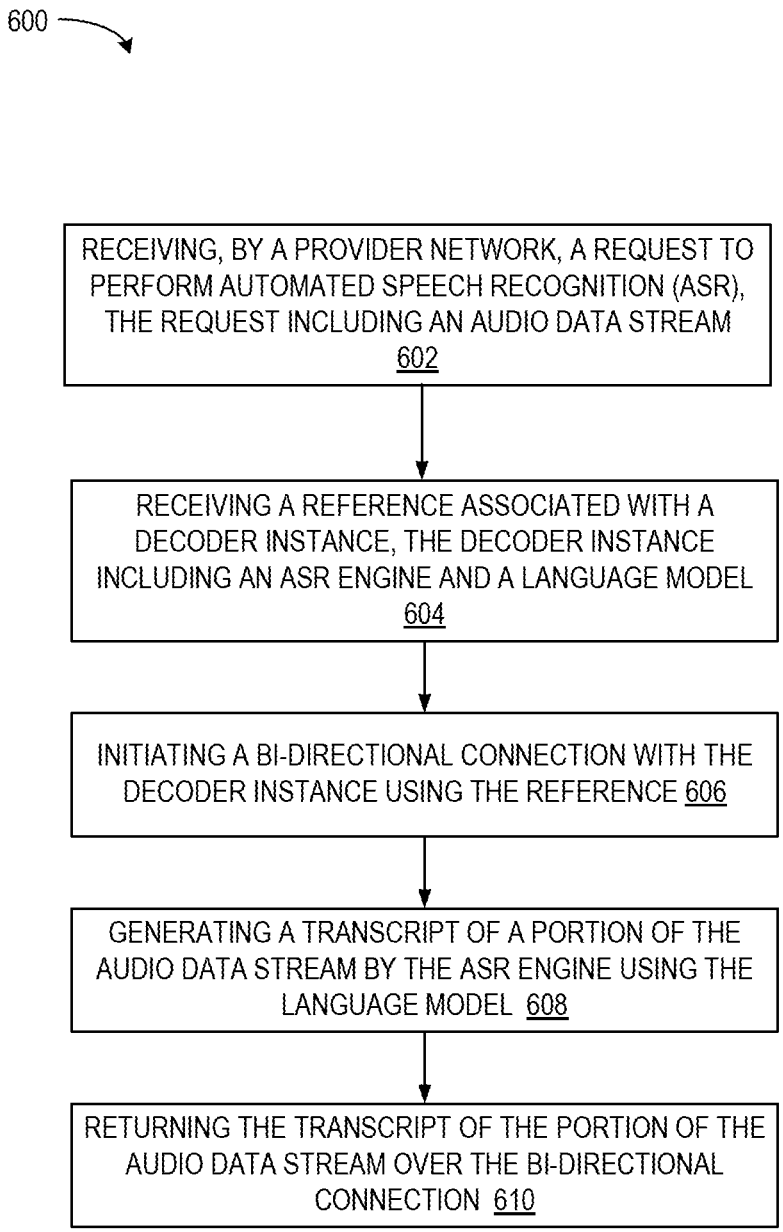
FIG. 6 is a flow diagram illustrating operations for streaming real-time automatic speech recognition according to some embodiments.

FIG. 6 is a flow diagram illustrating operations 600 (e.g., of a method) for streaming real-time automatic speech recognition according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the frontend service 112, job queue 114, metadata service 116, and/or decoder hosts 122 of the other figures.

The operations 600 include, at block 602, receiving a request to perform automated speech recognition (ASR), the request including an audio data stream. In some embodiments, the operations may further include dividing the audio data stream into a plurality of portions based on silence detected in the audio data stream, each of the plurality of portions being less than or equal to a configurable length of time. In some embodiments, a first signature can be added to a content of each portion of the audio data stream, and a second signature can be added to a header of each portion of the audio data stream. The portion of the audio data stream is processed if the second signature references the first signature of a previous portion of the audio data stream.

The operations 600 include, at block 604, receiving a reference associated with a decoder host, the decoder host including an ASR engine and a language model. In some embodiments, the request can be added to a queue that is accessible to a plurality of decoder hosts. The queue can be polled by the decoder host from the plurality of decoder hosts, wherein the reference to the decoder host is an IP address. As discussed, in some embodiments, the decoder host can add the reference associated with the decoder host to a metadata service, using a host ID or IP address as a key associated with a request ID as a value. The frontend service can obtain the reference associated with the decoder host through the metadata service. In some embodiments, the reference associated with the decoder host can be requested from a host management service, the host management service caching a list of decoder hosts and their availability. After the reference has been provided, the list of decoder hosts can be updated to indicate the decoder host is in use.

The operations 600 include, at block 606, initiating a bi-directional connection with the decoder host using the reference. In some embodiments, the bi-directional connection is a bi-directional streaming HTTP/2 connection. The operations 600 include, at block 608, generating a transcript of a portion of the audio data stream by the ASR engine using the language model. The operations 600 include, at block 610, returning the transcript of the portion of the audio data stream over the bi-directional connection.

In some embodiments, each request to perform ASR is associated with a session token. In some embodiments, the operations may further include determining a loss of connection with the audio data stream, retrieving backup audio data from a buffer, and maintaining the decoder host for a configurable amount of time. In some embodiments, the operations may further include receiving a new request to perform ASR on the audio data stream, the second request including the session token, and routing the audio data stream to the decoder host.

In some embodiments, the operations may further include determining a utilization rate of a plurality of decoder hosts in a provider network, wherein the utilization rate is based on a number of concurrent audio data streams being received relative to a number of decoder hosts in the plurality of decoder hosts and is further based on a number of decoder hosts in use, and adding or removing one or more decoder hosts based on the utilization rate.

In some embodiments, the operations may include receiving, by an automated speech recognition (ASR) service in a provider network, a request to perform ASR, the request including an audio data stream, authorizing the request with an authorization service using account data associated with the request, adding the request to a queue that is accessible to a plurality of decoder hosts, polling the queue by a decoder host from the plurality of decoder hosts, the decoder host including an ASR engine and a language model, the decoder host deployed to a private network in the provider network, receiving an IP address associated with the decoder host, initiating a bi-directional connection with the decoder host using the IP address, routing the audio data stream to the decoder host over the bi-directional connection, dividing the audio data stream into a plurality of portions based on silence detected in the audio data stream, generating a transcript of a portion of the audio data stream by the ASR engine using the language model, and returning the transcript of the portion of the audio data stream over the bi-directional connection.

In some embodiments, the operations may further include receiving audio data through the audio data stream prior to initiating the bi-directional connection with the decoder host, adding the audio data to a buffer, and routing the audio data from the buffer to the decoder host after initiating the bi-directional connection.

In some embodiments, the operations may further include decoding a first portion of the audio stream, identifying an audio stream type based on the first portion of the audio stream, adding an identifier associated with the audio stream type to an entry associated with the request in a metadata service, and wherein the decoder host is configured to decode the audio stream type.

In some embodiments, the operations may further include receiving a request to add a custom dictionary, the request including a plurality of phrases or a reference to the plurality of phrases, generating the custom dictionary using the plurality of phrases, and assigning an identifier to the custom dictionary, wherein the request to perform ASR includes the identifier to the custom dictionary.

Figure 7:
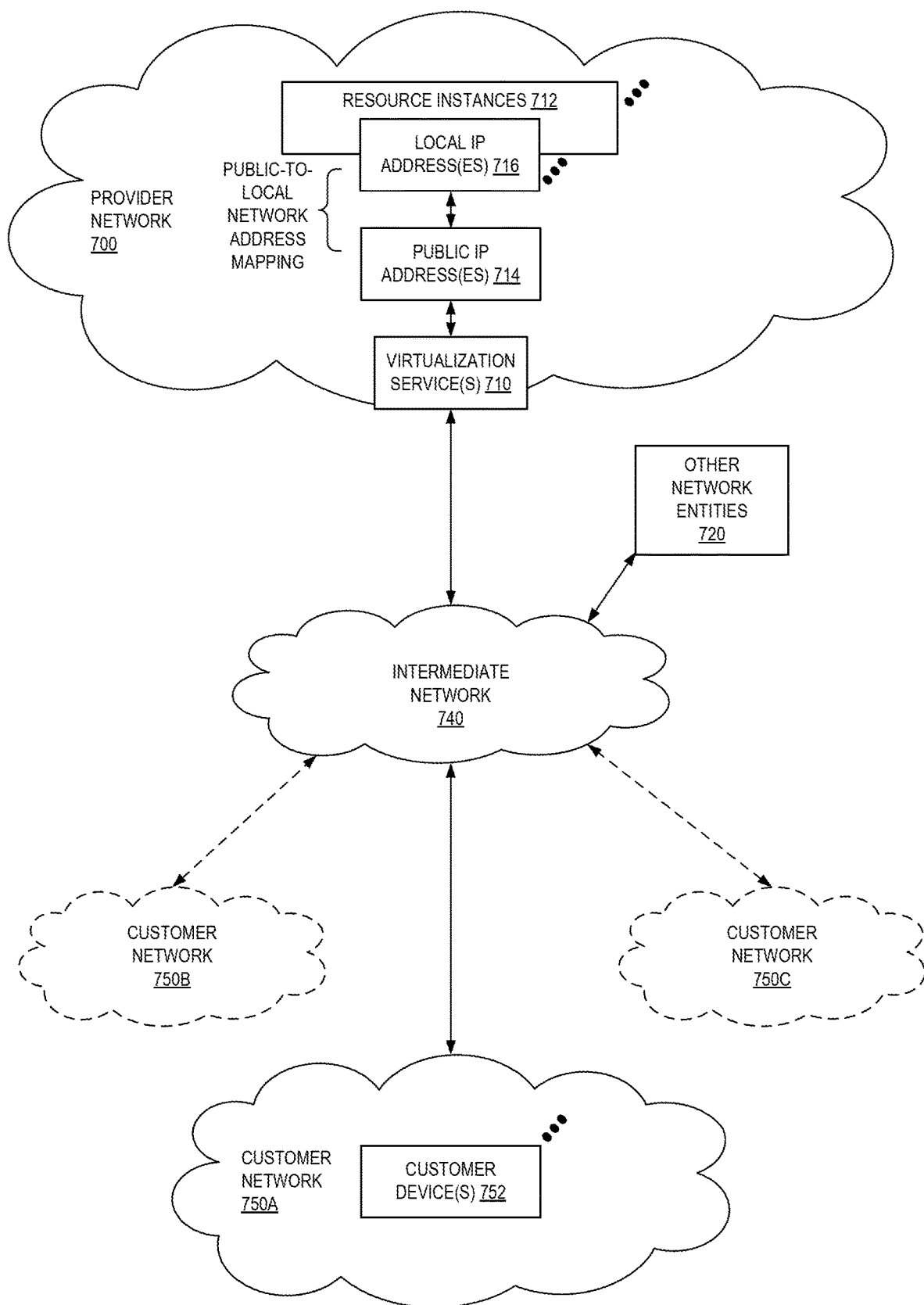
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 7 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
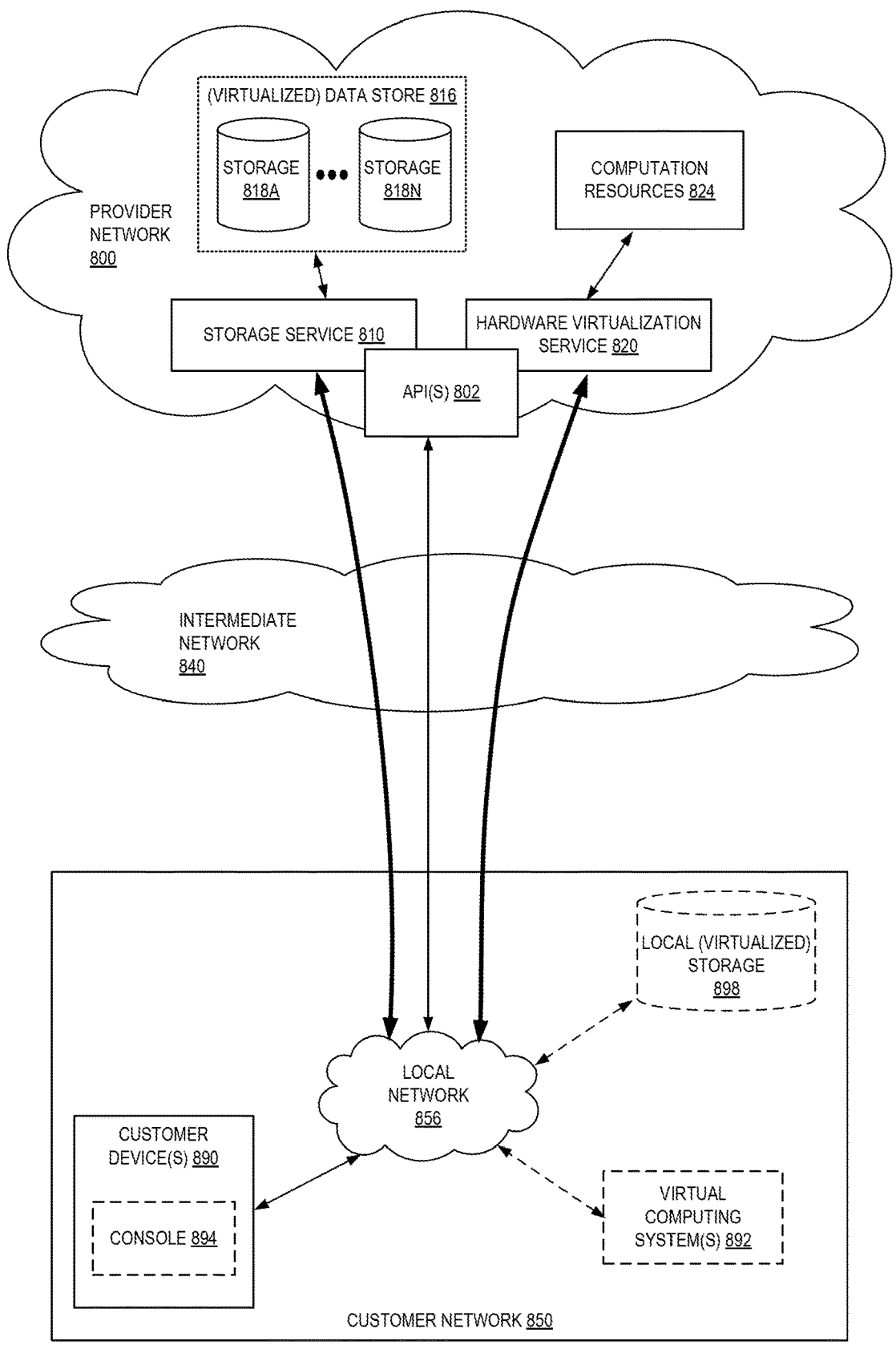
FIG. 8 is a block diagram of an example provider network that provides a storage virtualization service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
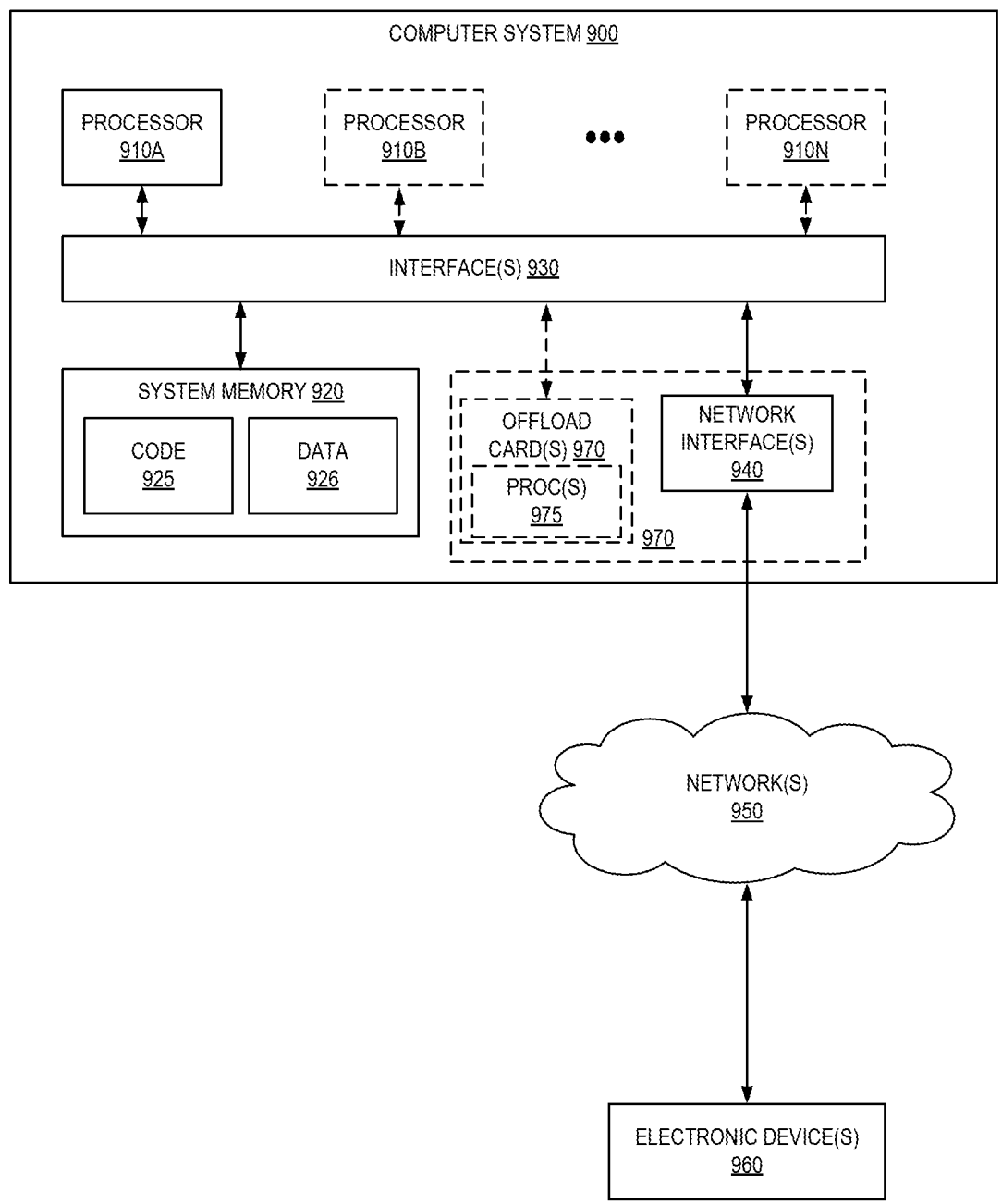
FIG. 9 is a block diagram illustrating an example computer system that may be used in some embodiments.

In some embodiments, a system that implements a portion or all of the techniques for streaming real-time automatic speech recognition as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-

910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, by an automated speech recognition (ASR) service in a provider network, a request to perform ASR, the request including an audio data stream;

authorizing the request with an authorization service using account data associated with the request;

adding the request to a queue that is accessible to a plurality of decoder hosts;

polling the queue by a decoder host from the plurality of decoder hosts, the decoder host including an ASR engine and a language model, the decoder host deployed to a private network in the provider network;

receiving an IP address associated with the decoder host;

initiating a bi-directional connection with the decoder host using the IP address;

routing the audio data stream to the decoder host over the bi-directional connection;

dividing the audio data stream into a plurality of portions based on silence detected in the audio data stream;

generating a transcript of a portion of the audio data stream by the ASR engine using the language model; and returning the transcript of the portion of the audio data stream over the bi-directional connection.

2. The computer-implemented method of claim 1, further comprising:

adding a first signature to a content of each portion of the audio data stream; and adding a second signature to a header of each portion of the audio data stream, wherein the portion of the audio data stream is processed if the second signature references the first signature of a previous portion of the audio data stream.

3. The computer-implemented method of claim 1, further comprising:

receiving audio data through the audio data stream prior to initiating the bi-directional connection with the decoder host;

adding the audio data to a buffer; and routing the audio data from the buffer to the decoder host after initiating the bi-directional connection.

4. A computer-implemented method comprising:

receiving a request to perform automated speech recognition (ASR), the request including an audio data stream;

receiving a reference associated with a decoder host, the decoder host including an ASR engine and a language model;

initiating a bi-directional connection with the decoder host using the reference;

generating a transcript of a portion of the audio data stream by the ASR engine using the language model; and returning the transcript of the portion of the audio data stream over the bi-directional connection.

5. The computer-implemented method of claim 4, further comprising:

dividing the audio data stream into a plurality of portions based on silence detected in the audio data stream, each of the plurality of portions being less than or equal to a configurable length of time.

6. The computer-implemented method of claim 5, further comprising:

adding a first signature to a content of each portion of the audio data stream; and adding a second signature to a header of each portion of the audio data stream, wherein the portion of the audio data stream is processed if the second signature references the first signature of a previous portion of the audio data stream.

7. The computer-implemented method of claim 4, further comprising:
adding the request to a queue that is accessible to a plurality of decoder hosts; and
polling the queue by the decoder host from the plurality of decoder hosts, wherein the reference to the decoder host is an IP address.

8. The computer-implemented method of claim 4, wherein the request to perform ASR is associated with a session token, and further comprising:
determining a loss of connection with the audio data stream;
retrieving backup audio data from a buffer; and
maintaining the decoder host for a configurable amount of time.

9. The computer-implemented method of claim 8, further comprising:
receiving a new request to perform ASR on the audio data stream, the second request including the session token; and
routing the audio data stream to the decoder host.

10. The computer-implemented method of claim 4, further comprising:
determining a utilization rate of a plurality of decoder hosts in a provider network, wherein the utilization rate is based on a number of concurrent audio data streams being received relative to a number of decoder hosts in the plurality of decoder hosts and is further based on a number of decoder hosts in use; and
adding or removing one or more decoder hosts based on the utilization rate.

11. The computer-implemented method of claim 4, wherein the bi-directional connection is a bi-directional streaming HTTP/2 connection.

12. The computer-implemented method of claim 4, further comprising:
requesting the reference associated with the decoder host from a host management service, the host management service caching a list of decoder hosts and their availability; and
updating the list of decoder hosts to indicate the decoder host is in use.

13. The computer-implemented method of claim 4, further comprising:
decoding a first portion of the audio stream;
identifying an audio stream type based on the first portion of the audio stream;
adding an identifier associated with the audio stream type to an entry associated with the request in a metadata service; and
wherein the decoder host is configured to decode the audio stream type.

14. The computer-implemented method of claim 4, further comprising:
receiving a request to add a custom dictionary, the request including a plurality of phrases or a reference to the plurality of phrases;

generating the custom dictionary using the plurality of phrases; and
assigning an identifier to the custom dictionary, wherein the request to perform ASR includes the identifier to the custom dictionary.

15. A system comprising:
a provider network implemented by a first one or more electronic devices; and
an automated speech recognition (ASR) service implemented by a second one or more electronic devices in the provider network, the ASR service including instructions that upon execution cause the ASR service to:
receive a request to perform automated speech recognition (ASR), the request including an audio data stream;
receive a reference associated with a decoder host, the decoder host including an ASR engine and a language model;
initiate a bi-directional connection with the decoder host using the reference;
generate a transcript of a portion of the audio data stream by the ASR engine using the language model; and
return the transcript of the portion of the audio data stream over the bi-directional connection.

16. The system of claim 15, wherein the instructions, upon execution, further cause the ASR service to:
divide the audio data stream into a plurality of portions based on silence detected in the audio data stream, each of the plurality of portions being less than or equal to a configurable length of time.

17. The system of claim 16, wherein the instructions, upon execution, further cause the ASR service to:
add a first signature to a content of each portion of the audio data stream; and
add a second signature to a header of each portion of the audio data stream, wherein the portion of the audio data stream is processed if the second signature references the first signature of a previous portion of the audio data stream.

18. The system of claim 15, wherein the instructions, upon execution, further cause the ASR service to:
add the request to a queue that is accessible to a plurality of decoder hosts; and
poll the queue by the decoder host from the plurality of decoder hosts, wherein the reference to the decoder host is an IP address.

19. The system of claim 15, wherein the request to perform ASR is associated with a session token, and wherein the instructions, upon execution, further cause the ASR service to:
determine a loss of connection with the audio data stream;
retrieve backup audio data from a buffer; and
maintain the decoder host for a configurable amount of time.

20. The system of claim 19, wherein the instructions, upon execution, further cause the ASR service to:
receive a new request to perform ASR on the audio data stream, the second request including the session token; and
route the audio data stream to the decoder host.

* * * * *